US008203298B2

(12) United States Patent
Lu et al.

(10) Patent No.: US 8,203,298 B2
(45) Date of Patent: Jun. 19, 2012

(54) SYSTEM AND METHOD FOR MOTOR SPEED ESTIMATION OF AN ELECTRIC MOTOR

(75) Inventors: Bin Lu, Kenosha, WI (US); Ting Yan, Brookfield, WI (US); Charles John Luebke, Sussex, WI (US); Santosh Kumar Sharma, Viman Nagar (IN)

(73) Assignee: Eaton Corporation, Cleveland, OH (US)

( * ) Notice: Subject to any disclaimer, the term of this patent is extended or adjusted under 35 U.S.C. 154(b) by 377 days.

(21) Appl. No.: 12/547,723

(22) Filed: Aug. 26, 2009

(65) Prior Publication Data
US 2011/0050142 A1 Mar. 3, 2011

(51) Int. Cl.
*H02P 23/14* (2006.01)

(52) U.S. Cl. ........ 318/461; 318/490; 318/466; 318/467; 318/468; 318/469

(58) Field of Classification Search .................. 318/461, 318/490, 466–470
See application file for complete search history.

(56) References Cited

U.S. PATENT DOCUMENTS

| | | | |
|---|---|---|---|
| 6,087,796 A * | 7/2000 | Canada et al. ................ | 318/565 |
| 6,529,135 B1 * | 3/2003 | Bowers et al. ................ | 340/648 |
| 7,184,902 B2 * | 2/2007 | El-Ibiary ........................ | 702/60 |
| 7,508,160 B1 * | 3/2009 | Rudniski ....................... | 318/801 |
| 7,557,528 B2 * | 7/2009 | Kumar et al. ................. | 318/565 |

OTHER PUBLICATIONS

Yaskawa, E7 Drive User Manual, Aug. 1, 2008.

* cited by examiner

*Primary Examiner* — Walter Benson
*Assistant Examiner* — David Luo
(74) *Attorney, Agent, or Firm* — Ziolkowski Patent Solutions Group, SC

(57) ABSTRACT

A system and method for a motor management system includes a computer readable storage medium and a processing unit. The processing unit configured to determine a voltage value of a voltage input to an alternating current (AC) motor, determine a frequency value of at least one of a voltage input and a current input to the AC motor, determine a load value from the AC motor, and access a set of motor nameplate data, where the set of motor nameplate data includes a rated power, a rated speed, a rated frequency, and a rated voltage of the AC motor. The processing unit is also configured to estimate a motor speed based on the voltage value, the frequency value, the load value, and the set of nameplate data and also store the motor speed on the computer readable storage medium.

24 Claims, 3 Drawing Sheets

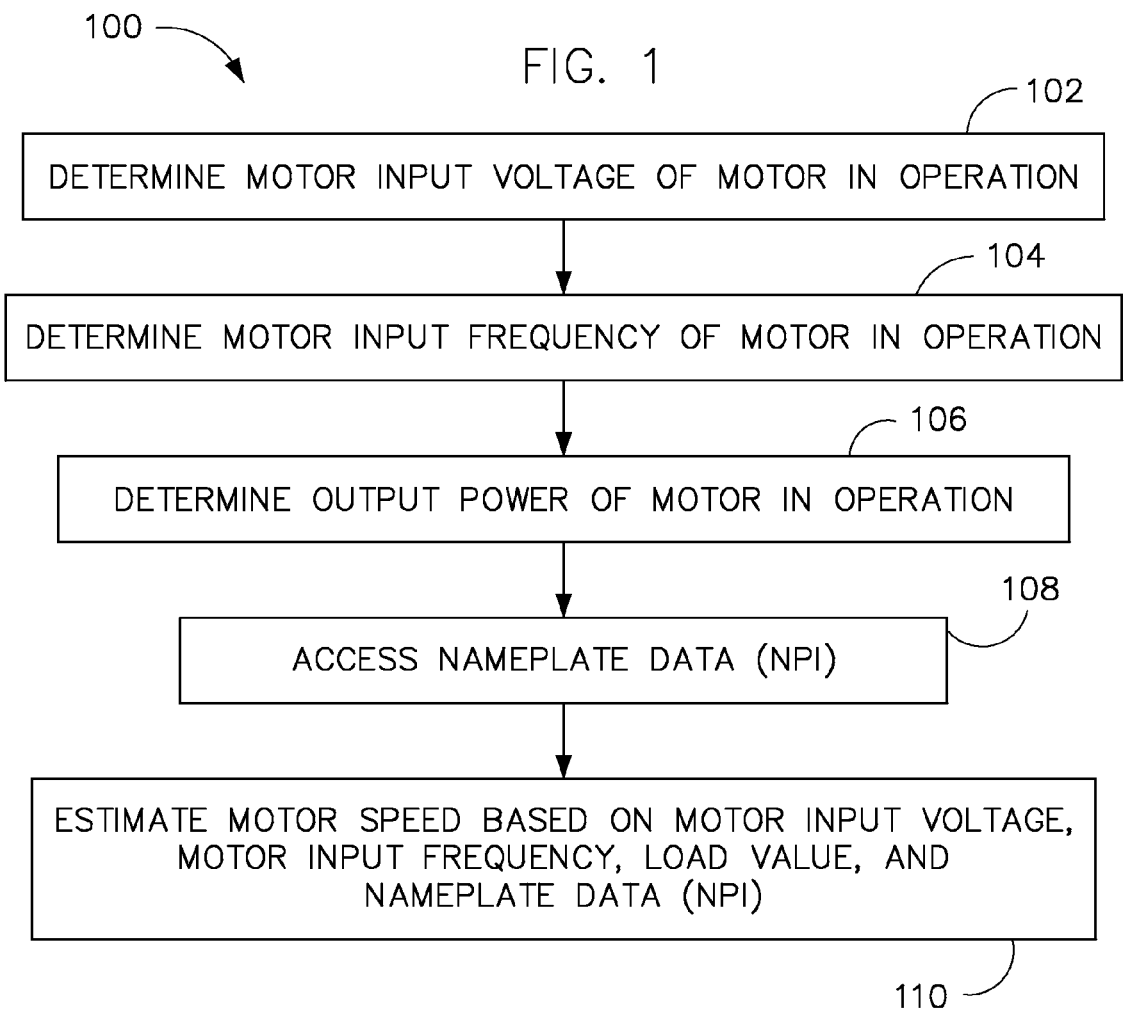
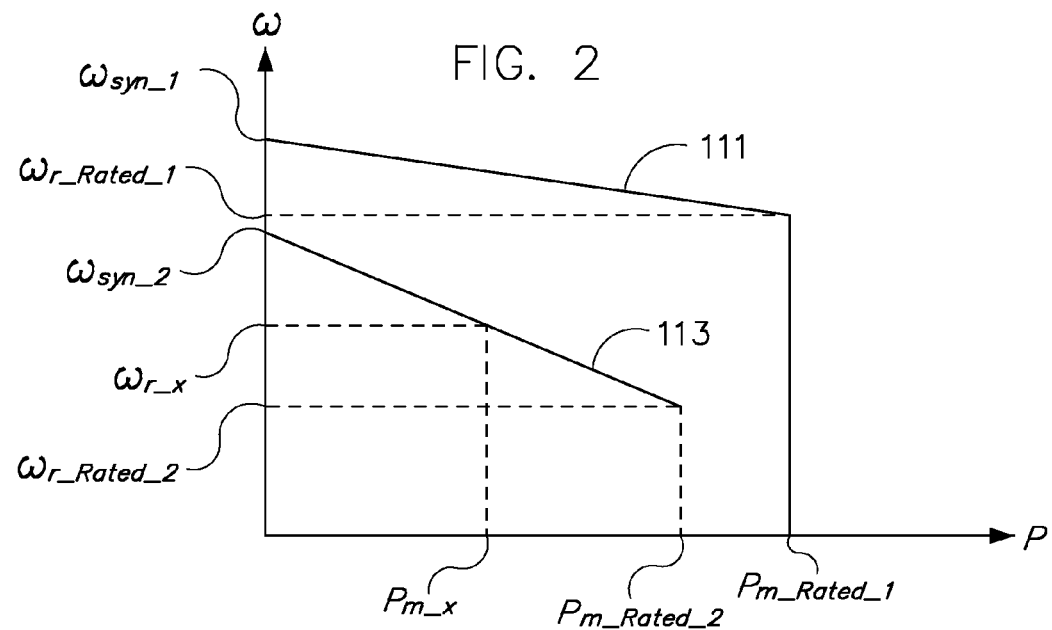

SYSTEM AND METHOD FOR MOTOR SPEED ESTIMATION OF AN ELECTRIC MOTOR

GOVERNMENT LICENSE RIGHTS

The U.S. Government has a paid-up license in this invention and the right in limited circumstances to require the patent owner to license others on reasonable terms as provided for by the terms of Contract No. DE-FC36-04GO14000, awarded by the United States Department of Energy.

BACKGROUND OF THE INVENTION

The present invention relates generally to electric motors and, more particularly, to a system and method for determining rotor speed of an electric motor.

Electric motors consume a large percentage of generated electricity capacity. Many applications for this "workhorse" of industry are fan and pump industrial applications. For example, in a typical integrated paper mill, low voltage and medium voltage motors may comprise nearly 70% of all driven electrical loads. Due to the prevalence of these motors in industry, it is paramount that the electric motors be operated reliably and efficiently. Motor design parameters and performance parameters are often required by motor management systems to optimize the control and operations of electric motors. Similarly, motor status monitoring enables the electric motors to operate reliably. Many motor status monitoring techniques also look for certain motor design parameters and performance parameters.

One such motor performance parameter that is helpful in optimizing the control and operations of electric motors is rotor or motor speed. Existing motor speed estimation methods for electric motors such as induction motors are typically based on motor equivalent models or complex digital signal processing techniques, such as Fast Fourier Transform (FFT) or other frequency-domain signal processing operations. For low-end motor control or monitoring products, these techniques often cannot be implemented because of hardware and software restrictions. For line-connected motors, the speed may be estimated using a technique that implements a linear speed-load curve derived from rated motor speed (RPM) and synchronous speed (RPM). However, for inverter-fed motors such as variable frequency drive (VFD) motors, such motor speed estimation often cannot be used since the rated RPM in the nameplate is only valid for rated motor operations (e.g., at a rated voltage and a rated frequency).

It would therefore be desirable to design a system and method for determining motor speed of an electric motor that is not dependent on set load, voltage, and frequency conditions, so as to enable the improved motor management and motor status monitoring for inverter-fed motors.

BRIEF DESCRIPTION OF THE INVENTION

The present invention provides a system and method for the determination of motor speed of an AC motor.

In accordance with one aspect of the invention, a motor management system includes a computer readable storage medium and a processing unit. The processing unit is configured to determine a voltage value of a voltage input to an alternating current (AC) motor during operation of the AC motor, determine a frequency value of at least one of a voltage input and a current input to the AC motor during operation of the AC motor, determine a load value from the AC motor during operation of the AC motor, and access a set of motor nameplate data, where the set of motor nameplate data includes a rated power, a rated speed, a rated frequency, and a rated voltage of the AC motor. The processing unit is also configured to estimate a motor speed of the AC motor in operation based on the voltage value, the frequency value, the load value, and the set of nameplate data and also store the motor speed on the computer readable storage medium.

In accordance with another aspect of the invention, a method for controlling motor speed includes determining a voltage of energy input into a motor in operation via a voltage sensing device, determining a frequency of energy input into the motor in operation, and determining a load value of the motor in operation. The method also includes estimating a motor speed of the motor in operation based on the voltage, the frequency, and the load value, where estimating the motor speed is free of frequency-domain signal processing operations. The method further includes storing the motor speed on a computer readable storage medium.

In accordance with yet another aspect of the invention, a motor speed estimation system is programmed to estimate a motor speed of a motor based on a frequency of energy input to the motor during operation, a voltage of the energy input to the motor during operation, a load value from the motor during operation, a rated output power of the motor, a rated speed of the motor, a rated voltage of the motor, and a rated frequency of the motor. The system is also programmed to store the motor speed on a computer storage device.

Various other features and advantages of the present invention will be made apparent from the following detailed description and the drawings.

BRIEF DESCRIPTION OF THE DRAWINGS

The drawings illustrate preferred embodiments presently contemplated for carrying out the invention.

In the drawings:

FIG. 1 is a flowchart depicting a technique for determining motor speed of an electric motor according to embodiments of the invention.

FIG. 2 is a graphical representation of a first speed curve of a motor operating at rated values and a second speed curve of a motor operating at an arbitrary voltage and frequency.

DETAILED DESCRIPTION OF THE PREFERRED EMBODIMENT

Figure 3:
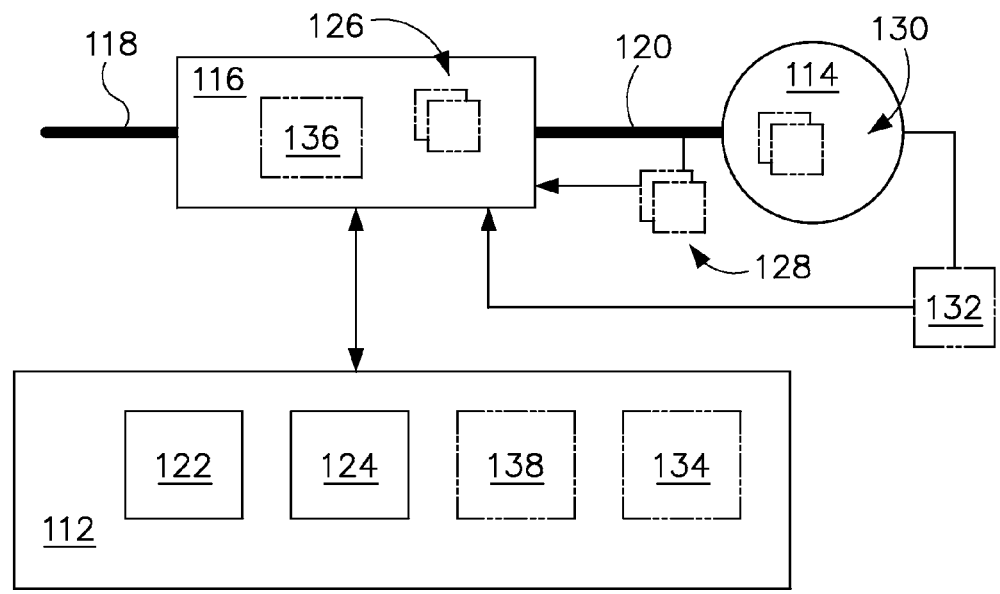
FIG. 3 is a block diagram of a system for determining motor speed of an electric motor according to an embodiment of the invention.

Embodiments of the invention set forth herein relate to a system and method for determining speed of an electric alternating current (AC) motor that is not dependent on set load, voltage, and frequency conditions, so as enable the improved motor management and motor status monitoring for an AC motor. The system, which may be disposed within a motor drive or a device or system external to a motor drive, is configured to monitor an operating AC motor and determines motor speed based on motor input frequency, motor input voltage, load, and nameplate data.

Referring to FIG. 1, a flowchart depicting a technique 100 for determining motor speed of an AC motor in operation according to an embodiment of the invention is shown. Technique 100 may be used to determine motor speed from a variety of AC motors. For example, technique 100 may be used to determine the motor speed of single-phase motors, multi-phase motors, inverter driven motors such as variable frequency driven motors, AC motors coupled to a soft-starter, and other types of AC motors or AC motor configurations. Further, embodiments of the invention are not limited to motors operating only at a rated frequency or voltage of the motors. Rather, embodiments of the invention, such as technique 100, are effective at estimating motor speed of AC motors that operate with varying input voltage(s) and/or varying input frequency(ies).

Technique 100 begins at block 102, where the line or input voltage of a motor is determined. In one embodiment, motor input voltage may be measured with a plurality of voltage sensors. For single-phase motors or for three-phase motors, technique 100 may be implemented to estimate the motor speed based on the motor input voltage of only one phase. However, for measurement of motor voltage input into a three-phase motor, motor input voltages of multiple phases may be determined and then averaged to produce a single input voltage value.

After the motor input voltage is determined 102, process control proceeds to block 104, where a line or motor input frequency of the AC motor is determined. The motor input frequency may, for example, be measured with a power analyzer. Alternatively, motor input frequency may be calculated from known operating parameters. For example, by using motor current and voltage waveforms and by detecting the zero crossing point of the current and voltage, the motor input frequency may be determined. As would be understood by those skilled in the art, it is contemplated that the input frequency may be determined from either the voltage or current input or induced into the motor.

After determining the motor input frequency 104, a load value such as a load percentage or power output of the motor during operation is determined at block 106. The load value may, for example, be sensed using a sensing device such as a power meter. Alternatively, a load value such as motor power output may be approximated to be equal to the input power of the motor or determined in another manner. Further details regarding the determination of the load value will be set forth in greater detail below with respect to Eqn. 10.

Following the determination of the load value 106, motor nameplate data or motor nameplate information (NPI) is accessed at block 108. According to embodiments of the invention, the NPI includes the rated operating frequency of the motor, the rated operating voltage of the motor, the rated operating speed of the motor, and the rated operating output power of the motor. These NPI parameters are available for electric motors on their nameplate tag. Such NPI may be accessed from a variety of sources. For example, NPI may be manually input by a user through a user interface. In addition, NPI may be accessed from a memory unit located either internal or external to a motor drive, which controls the motor. It is also envisioned that NPI could be gathered or accessed from a network such as, for example, the Internet.

It is noted that, according to embodiments of the invention, the order in which motor input voltage, motor input frequency, motor power output, and NPI are determined or accessed as shown in blocks 102-108 need not be the same as that shown in FIG. 1. Rather, NPI may be accessed and motor input voltage, motor input frequency, and the load value may be determined simultaneously or in another order different than the order shown in FIG. 1.

Referring back to the present embodiment shown in FIG. 1, after accessing NPI 108, process control proceeds to block 110, where the speed of the motor is determined based on the determined motor input voltage, the determined motor input frequency, the determined load value, and the accessed NPI.

According to one embodiment of the invention, the motor speed is estimated according to the following relationship:

$$\omega_{r\_x} = \frac{\omega_{r\_rated\_2} - \omega_{syn\_2}}{P_{m\_rated\_2}} \cdot P_{m\_x} + \omega_{syn\_2}, \quad \text{(Eqn. 1)}$$

where $\omega_{r\_x}$ refers to the motor speed (i.e., angular speed of the motor). As will be shown in detail below, the variables of Eqn. 1 may be determined from a motor input voltage, a motor input frequency, a motor load value, $P_{m\_x}$, such as motor power output or load percentage and NPI of the motor.

To estimate the speed of a motor according to the embodiment encompassed by Eqn. 1, begin by setting the accessed NPI of the motor to the following:

Rated Voltage, $\upsilon_{s\_1}$;
Rated Frequency, $f_{s\_1}$;
Rated Output Power, $P_{m\_rated\_1}$; and
Rated Speed in radians per second, $\omega_{r\_Rated\_1}$.

These NPI parameters represent rated values at a rated motor operating condition (i.e., a motor operating at rated voltage and rated frequency).

From the NPI, a rated torque of the motor may be defined as follows:

$$T_{rated\_1} = \frac{P_{m\_rated\_1}}{\omega_{r\_rated\_1}}, \quad \text{(Eqn. 2)}$$

In addition, a rated synchronous speed, $\omega_{syn\_1}$, of the motor may be determined in the following manner:

$$\omega_{syn\_1} = \frac{120 \cdot f_{s\_1}}{p} \cdot \frac{2\pi}{60}, \quad \text{(Eqn. 3)}$$

where p refers to the number of poles of the motor.

Next, a rated slip, $s_{rated\_1}$, of the motor may be determined in the following manner:

$$s_{rated\_1} = \frac{\omega_{syn\_1} - \omega_{r\_Rated\_1}}{\omega_{syn\_1}}, \quad \text{(Eqn. 4)}$$

Using Eqns. 1-4 above, a speed curve representative of an AC motor operating at rated operating parameters (e.g., rated voltage, $\upsilon_{s\_1}$, and rated frequency, $f_{s\_1}$) may be determined. An example of such a speed curve will be described below with respect to FIG. 2.

Still referring to the present embodiment, a motor speed of an AC motor operating at any arbitrary input voltage, $\upsilon_{s\_2}$, arbitrary input frequency, $f_{s\_2}$, and arbitrary load value, $P_{m\_x}$, can now be determined using the following set of equations:

$$s_{rated\_2} = s_{rated\_1} \cdot \left(\frac{f_{s\_1}}{f_{s\_2}}\right); \quad \text{(Eqn. 5)}$$

-continued $$\omega_{syn\_2} = \omega_{syn\_1} \cdot \left(\frac{f_{s\_2}}{f_{s\_1}}\right), ;$$ (Eqn. 6)

$$\omega_{r\_rated\_2} = \omega_{syn\_2} \cdot (1 - s_{rated\_2}), ;$$ (Eqn. 7)

$$T_{rated\_2} = T_{rated\_1} \cdot \left(\frac{\upsilon_{s\_2}}{\upsilon_{s\_1}}\right)^2 \cdot \left(\frac{f_{s\_1}}{f_{s\_2}}\right)^2, ;$$ (Eqn. 8)

and $$P_{m\_rated\_2} = T_{rated\_2} \cdot \omega_{r\_rated\_2}, .$$ (Eqn. 9)

By implementing equations 2-9, the speed, $\omega_{r\_x}$, of an AC motor operating at any given load (e.g., when the motor delivers any given mechanical output power $P_{m\_x}$) any given input voltage, $\upsilon_{s\_2}$, and any given input frequency, $f_{s\_2}$, may be estimated in the manner set forth by Eqn. 1, shown again below:

$$\omega_{r\_x} = \frac{\omega_{r\_rated\_2} - \omega_{syn\_2}}{P_{m\_rated\_2}} \cdot P_{m\_x} + \omega_{syn\_2}, .$$ (Eqn. 1)

In other words, as shown with Eqns. 1-9 above and the accompanying description, the motor speed, $\omega_{r\_x}$, may be estimated merely with the determined motor input voltage, $\upsilon_{s\_2}$, the determined motor input frequency, $f_{s\_2}$, the determined load value, $P_{m\_x}$, such as motor power output, and the accessed NPI (i.e., rated motor power, $P_{m\_rated\_1}$, rated motor speed, $\omega_{r\_Rated\_1}$, rated voltage, $\upsilon_{s\_1}$, and rated frequency, $f_{s\_1}$, of the motor). Embodiments of the invention produce effective speed estimations at any arbitrary input voltage, $\upsilon_{s\_2}$, and any arbitrary input frequency, $f_{s\_2}$—not just at a rated voltage and rated frequency of the AC motor. Further, such embodiments avoid the need to implement frequency-domain signal processing operations such as Fast Fourier Transform (FFT) operations or wavelet analysis operations.

Referring now to FIG. 2, a first determined speed curve 111 of a motor operating at rated values (e.g., at rated frequency $f_{s\_1}$, rated voltage $\upsilon_{s\_1}$, and rated output power $P_{m\_rated\_1}$) and a second determined speed curve 113 of the motor operating at an arbitrary input voltage $\upsilon_{s\_2}$, arbitrary input frequency $f_{s\_2}$, and arbitrary output power $P_{m\_x}$ is shown according to an embodiment of the invention. Together, first and second determined speed curves 111, 113 serve as a graphical representation of the embodiments encompassed by Eqns. 1-9.

As shown, first determined speed curve 111 is defined by the rated output power, $P_{m\_rated\_1}$, the rated motor speed, $\omega_{r\_Rated\_1}$, and the rated synchronous speed, $\omega_{syn\_1}$ (e.g., see Eqn. 3). It is noted, however, that first determined speed curve 111 may instead be determined from empirically determined data rather than NPI.

By implementing Eqns. 2-9, second determined speed curve 113 may be linearly determined or estimated from first determined speed curve 111. As shown, second determined speed curve 113 is defined by $P_{m\_rated\_2}$, $\omega_{r\_rated\_2}$, and $\omega_{syn\_2}$. $P_{m\_rated\_2}$ may be considered a modified rated power (e.g., see Eqn. 9), $\omega_{r\_rated\_2}$ may be considered a modified rated motor speed (e.g., see Eqn. 7), and $\omega_{syn\_2}$ may be considered a modified rated synchronous speed (e.g., see Eqn. 6). Each of $P_{m\_rated\_2}$, $\omega_{r\_rated\_2}$, and the $\omega_{syn\_2}$ can be determined from the rated parameters of first determined speed curve 111 and $\upsilon_{s\_2}$ and $f_{s\_2}$ (i.e., the any given input voltage and the any given frequency).

Accordingly, motor speed $\omega_{r\_x}$ may be determined from second determined speed curve 113 when the output power $P_{m\_x}$ (or load percentage in an alternate embodiment) is determined. It is noted that the power axis, P, of FIG. 2 could be replaced with a load percentage axis. In such an instance, Eqns. 1-9 could be derived to illustrate the dependence on a load percentage, effectively solving for the motor speed, $\omega_{r\_x}$, in substantially the same manner.

It is also noted that input voltage, $\upsilon_{s\_2}$, input frequency, $f_{s\_2}$, and load value (e.g., power output, $P_{m\_x}$), may be measured with respective sensing devices or may be calculated or determined in another manner. For example, output power, $P_{m\_x}$, may be determined from input power, $P_{i\_x}$, in a manner set forth by Eqn. 10 below:

$$P_{m\_x} = \eta \cdot P_{i\_x},$$ (Eqn. 10), where $P_{i\_x}$ refers to the power input to the motor. The power input value, $P_{i\_x}$, may be measured using a power meter. However, power input, $P_{i\_x}$, may also be estimated/calculated. For example, using known relationships such as P=VI cos($\phi$) for a single phase motor, power input may be estimated by using determined input current and voltage values of the motor.

Still referring to Eqn. 10, $\eta$ refers to an empirical average efficiency of the motor, which may be stored in a memory medium. Exemplary efficiencies, $\eta$, as they relate to rated horsepower, $P_{m\_rated\_1}$, of motors of various sizes are shown in TABLE 1 below. Other efficiency estimates, however, may be used.

TABLE 1

| Motor Power Rating ($P_{m\_rated\_1}$) | Approximate Motor Efficiency ($\eta$) |
|---|---|
| <5 HP | 85% |
| 5-30 HP | 88% |
| 30-100 HP | 92% |
| >1000 HP | 95% |

In an alternate embodiment, motor power output $P_{m\_x}$ may be determined from a load percentage value. For example, using a known load percentage value, L, power output, $P_{m\_x}$, may be determined from the following relationship:

$$P_{m\_x} = \frac{L \cdot P_{m\_rated\_1}}{100}, .$$ (Eqn. 11)

As such, by substituting Eqn. 11 into Eqn. 1, motor speed, $\omega_{r\_x}$, may be determined without directly determining motor power output. Rather a determined load percentage value, L, and the rated horsepower, $P_{m\_rated\_1}$, may be used, effectively determining an output power indirectly. The load percentage value, L, may, for example, be determined by the motor drive or from a load percentage sensor coupled to the motor.

In yet another embodiment, rather than measuring motor power output or estimating the power output using motor efficiency, $\eta$, and power input, $P_{i\_x}$, the motor power input may be approximated to be the motor power output. That is, motor power input, $P_{i\_x}$, may be used as an approximation of motor power output, $P_{m\_x}$. It is noted, however, that when approximating power output to equal power input, speed estimations may be more accurate when the motor load is either less than thirty percent of capacity or greater than ninety percent of rated load. In other words, approximating power input to equal power output may not be as accurate when the motor load percentage is in a thirty to ninety percent capacity range. It is noted that, depending on the application, ranges other than thirty to ninety percent may determine the accuracy of such approximations. For example, it may be determined that approximating power input to equal power output may produce more accurate results when the motor load percentage is in a range from forty to eighty-five percent.

As discussed above, speed of a motor may be estimated using load values determined in a variety of manners. For example, a load value may be determined from a sensor that determines a load percentage, a power input value, and/or a motor power output value. In addition, if relying on an estimated power output value, power input may be equated to power output or a relationship such as Eqn. 10 may be relied upon to determine a power output value from a power input value.

Embodiments of the invention may rely on voltage, frequency, current, and/or power sensors of a motor drive and/or motor to determine input values for estimating motor speed. Further, it is noted that the estimation of motor speed, $\omega_{r\_x}$, does not require strict hardware or software requirements since embodiments of the invention do not require the implementation of "complex" digital processing techniques such as a frequency-domain signal processing techniques (e.g., a fast Fourier transform (FFT) technique or a wavelet analysis technique) that manipulate a large quantity of data points. It is also noted that embodiments of the invention allow for determination of motor speed at any arbitrary input voltage, any arbitrary input frequency, and any arbitrary load.

Referring now to FIG. 3, a block diagram of an external device 112 configured to estimate the speed of an AC motor 114 is shown according to an embodiment of the invention. In the present embodiment, external device 112 is coupled to an variable-frequency-drive (VFD) 116 that, upon conditioning a supply energy 118 to produce a proper motor input energy 120, drives motor 114. External device 112 may either be fixedly attached to VFD 116 or removably coupled to VFD 116. It is noted that embodiments of the inventions are effective with any type of AC motor, not just an AC motor coupled to a VFD such as VFD 116.

According to one embodiment shown in FIG. 3, external device 112 includes a processor 122 and a memory module 124. External device 112 can be configured or programmed to monitor the voltage and frequency input to motor 114 via VFD 116. Additionally, external device 112 may monitor or determine the motor load value(s) (e.g., load percentage or output power) of motor 114.

In one embodiment, data representative of the motor input voltage, the motor input frequency, and the load value(s) pass to processor 122, and processor 122 accesses NPI from memory module 124. Using the motor input voltage data, the motor input frequency data, the load value(s), and the NPI (i.e., rated voltage, rated frequency, rated power, and rated motor speed of motor 114), processor 122 estimates the speed of motor 114 in a manner based on embodiments of the invention (e.g., implementing one or more embodiments discussed above with respect to FIG. 1). External device 112 of FIG. 3 need not have any voltage, frequency, current, or power sensors to estimate the motor speed of motor 114. Rather, external device 112 may rely on one or more sensors 126 (shown in phantom) of VFD 116 and/or one or more sensors 128 (shown in phantom) coupled to motor input energy 120, and/or one or more sensors 130 (shown in phantom) of motor 114 to provide appropriate inputs to estimate motor speed. Further, an output sensor 132 (shown in phantom) coupled to motor 114 may provide the output power value to VFD 116 to estimate motor speed.

It is contemplated that the estimated speed may be stored on a computer readable storage medium 134 (shown in phantom) of external device 112. Alternatively, the estimated speed may be stored on memory module 124.

It is also contemplated that external device 112 may convey the estimated motor speed to VFD 116. As such, VFD 116 may use such information to, for example, implement a management strategy. Alternatively, external device 112 may display the motor speed on an external device display 138 (shown in phantom) and/or on an VFD display 136 (shown in phantom). As such, a user may utilize such information to modify the motor speed if desired.

Figure 4:
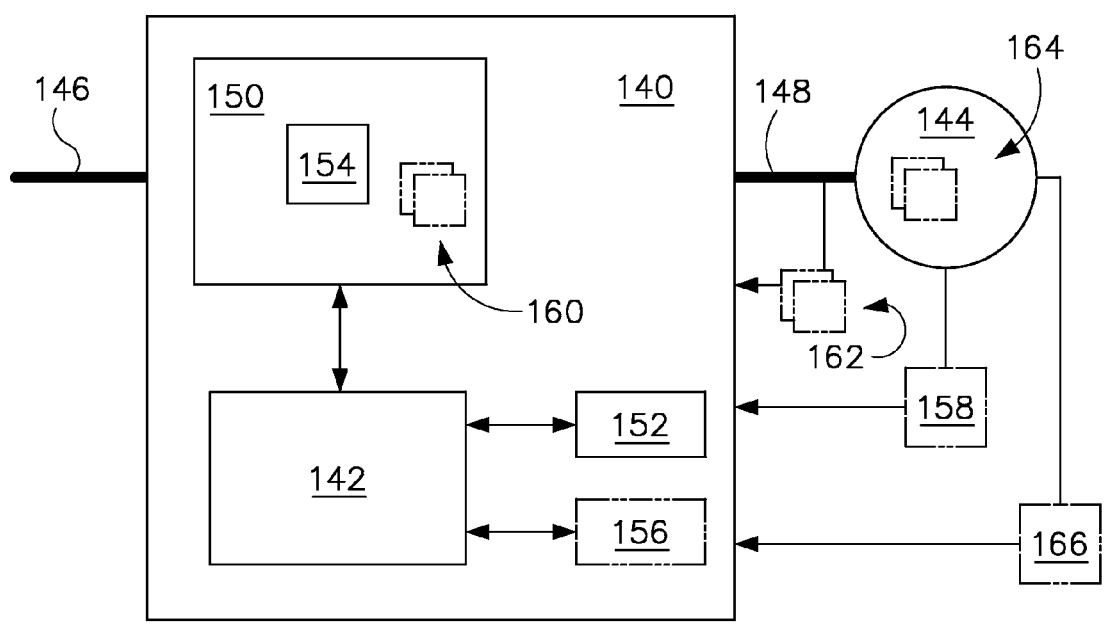
FIG. 4 is a block diagram of a system for determining motor speed of an electric motor according to another embodiment of the invention.

Referring now to FIG. 4, a block diagram of a VFD 140 having a motor speed estimator 142 to estimate motor speed of a motor 144 is shown according to an exemplary embodiment of the invention. A supply energy 146 enters VFD 140, and VFD 140 conditions this energy to produce a proper motor input energy 148 that drives motor 144.

As shown in FIG. 4, VFD 140 includes a drive control module 150, a motor speed estimator 142, and a memory module 152. An input/output (I/O) device 154 of drive control module 150 allows a user to enter a frequency or speed command to VFD 140 to determine the input frequency to motor 144. It is contemplated that motor speed estimator 142 may either be a hardware component (e.g., a processor) or a software/firmware component of, for example, drive control module 150.

Drive control module 150 conveys a motor input voltage value, a motor input frequency value, and a load value such as, for example, a power output or input value to motor speed estimator 142. Based on the motor input voltage value, the motor input frequency value, the load value, and NPI accessed from memory module 152, motor speed estimator 142 estimates the speed of motor 144. Motor speed estimator 142 may, for example, implement technique 100 of FIG. 1 and/or embodiments thereof to estimate the motor speed of motor 144 of FIG. 4. Once determined, the motor speed may be stored on a computer readable storage medium or device 156 (shown in phantom) and/or memory module 152.

In addition to storing the estimated speed on a storage device (e.g., 152, 156) the estimated speed of the motor may be conveyed to, and displayed on, I/O device 154. As such, based on the displayed speed, a user may modify the input frequency or another parameter to adjust the speed if desired.

As discussed above, motor speed may be estimated using a load value such as a power output value, a power input value, or both a power output value and a power input value. In one embodiment, if relying only on a power output value to estimate motor speed, a power meter 158 (shown in phantom) coupled to motor 144 may be used to determine the output power of motor 144 and convey the power output value to motor speed estimator 142 of VFD 140.

In an alternate embodiment, where a power input value is used to estimate a power output value, which in turn is used to estimate motor speed, motor speed estimator 142 may use a power input value, a motor efficiency value, and a relationship such as Eqn. 10 to estimate the power output value. In such an instance, motor speed estimator 142 accesses an efficiency value from memory module 152 in order to determine the power output value based on Eqn. 10 above.

If relying on a motor power input value to estimate the motor power output value, as for example with respect to Eqn. 10, the power input value may be determined or calculated by a variety of techniques or methods. For example, if AC motor 144 is a three-phase motor, motor speed estimator 142 or drive control module 150 may determine the input power based on voltage and current values of each phase to calculate the power input to motor 144. For example an equation such as $P_i = v_a i_a + v_b i_b + v_c i_c = -v_{ca}(i_a + i_b) - v_{ab} i_b$, where, $v_{ab}$, $v_{bc}$, and $v_{ca}$ are the line-to-line voltages, $v_a$, $v_b$, and $v_c$ are the line-to-neutral voltages, and $i_a$, $i_b$, and $i_c$ are the phase currents, may be relied upon to determine the power input to motor 144 if motor 144 is a three-phase motor. Alternatively, power input may merely be based on a voltage and current value of one of the three phases of a three-phase motor. Similarly, if AC motor 144 is a single-phase motor, the voltage and current of the single phase may be used to determine the input power.

In yet another embodiment, rather than estimating a motor speed based on a measured or calculated power output (i.e., a load value) of motor 144, motor speed estimator 142 uses a power input value to approximate the power output of motor 144. For example, outside a load range of 30%-90%, a motor power input may provide an adequate estimation of motor power output. As such, rather than conveying a power output value to motor speed estimator 142, drive control module 150 may convey a power input value, which serves as a load value, to motor speed estimator 142. Alternatively, motor speed estimator 142, rather than drive control module 150, may determine the motor power input value based on operating parameters to approximate the motor power output value.

Parameters to estimate motor speed may be calculated and/or determined from sensors. For example, input frequency, input voltage, output power, and/or input power may be determined via one or more sensors 160 (shown in phantom) of drive control module 150, one or more sensors 162 (shown in phantom) coupled to output energy 148, and/or one or more sensors 164 (shown in phantom) of motor 144. Further, an output sensor 166 (shown in phantom) coupled to motor 144 may be used to provide an output power value to drive control module 150.

The embodiments depicted in FIG. 4 may be considered an open-loop system. That is, using the estimated motor speed, a user may modify motor parameters (e.g., motor input frequency) via I/O device 154 to affect the motor speed of motor 144. However, it is envisioned that embodiments of the invention may function in a closed-loop system such that changes to motor speed occur automatically—without user input.

Figure 5:
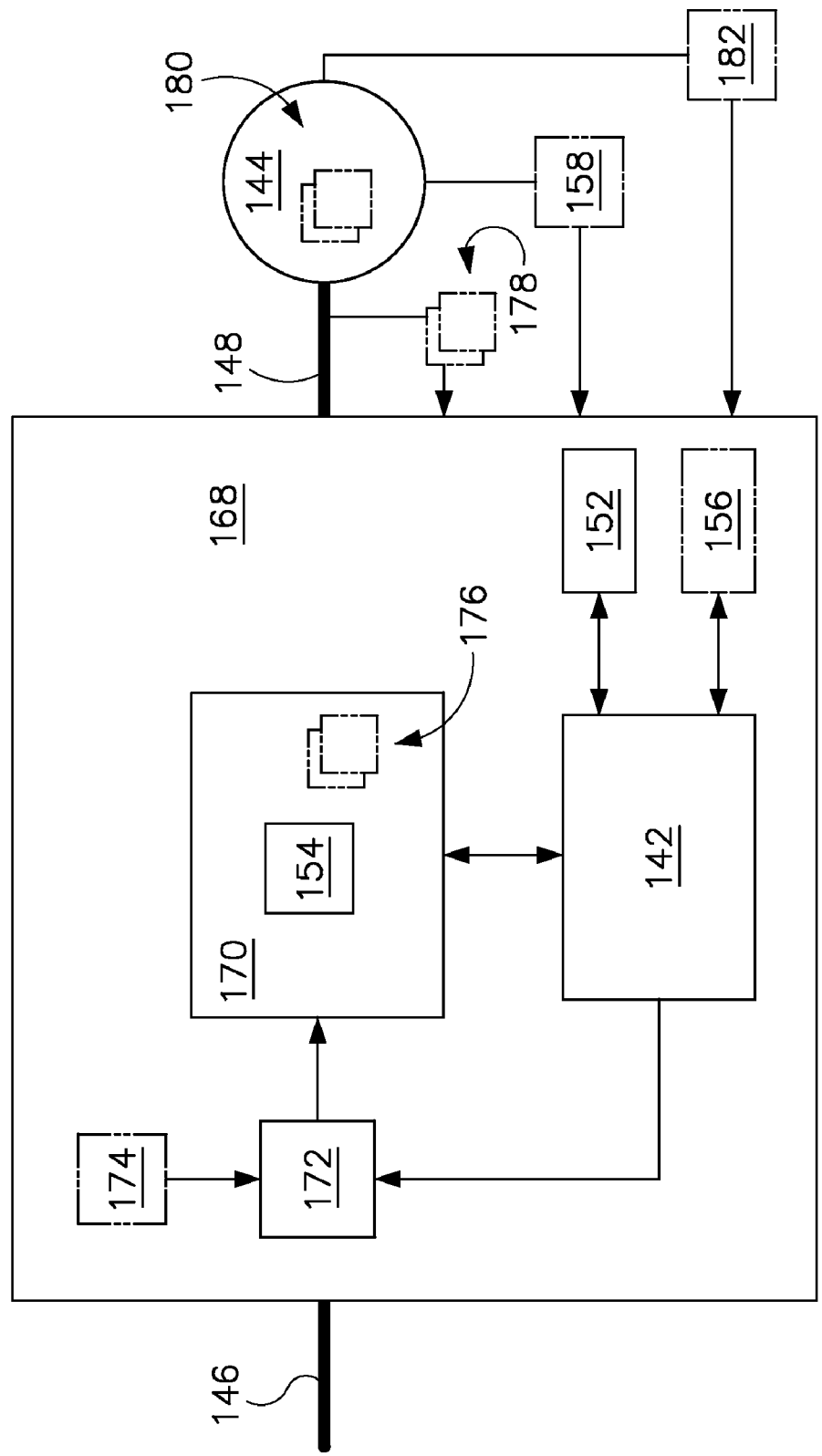
FIG. 5 is a block diagram of a system for determining motor speed of an electric motor according to yet another embodiment of the invention.

FIG. 5, for example, is a block diagram of an VFD 168 that employs a closed-loop system according to an embodiment of the invention. VFD 168 includes a drive control module 170, motor speed estimator 142, memory module 158, and a speed controller 172. It is contemplated that speed controller 172 may be a separate hardware component or, alternatively, a software/firmware component of drive control module 170 or motor speed estimator 142.

Coupled to VFD 168 is AC motor 144, which may either be a single or multi-phase motor. It is contemplated that VFD 168 include an input device 174 (shown in phantom), where a user may enter one or more control commands. For example, a user may enter a preferred motor speed or frequency command into input device 174 to initiate operation of AC motor 144.

Similar to embodiments discussed above with respect to FIG. 4, drive control module 170 of FIG. 5 conveys a motor input voltage value, a motor input frequency value, and a load value to motor speed estimator 142. Motor input values may be determined from one or more sensors. For example, one or more sensors 176 (shown in phantom) of VFD 168, one or more sensors 178 (shown in phantom) coupled to output energy 148, and/or one or more sensors 180 (shown in phantom) of motor 144 may provide the appropriate input values for the motor speed estimation. Further, a sensor 182 (shown in phantom) coupled to an output of motor 144 may provide the load value (e.g., an output power value) to VFD 168 for motor speed estimation.

After receiving appropriate input values, motor speed estimator 142 then estimates a motor speed of motor 144 based on the motor input voltage value, the motor input frequency value, the load value, and NPI accessed from memory module 152, where the NPI includes a rated voltage, a rated frequency, a rated speed, and a rated power of motor 144. The load value may be determined via the same or similar techniques discussed above with respect to FIGS. 1-4.

In contrast to the embodiment discussed above with respect to FIG. 4, according to an embodiment of FIG. 5, motor speed estimator 142 conveys the estimated speed to speed controller 172. As such, based on a preferred motor speed input by a user, speed controller 172 may send data commands to drive control module 170 to cause drive control module 170 to either raise or lower the speed of motor 144 such that the actual estimated motor speed matches or more closely matches the preferred motor speed input by the user. As such, the embodiment of FIG. 5 is a closed-loop system, because user input is no longer needed to adjust the motor speed of motor 144 after an initial motor speed command is entered.

A technical contribution for the disclosed system, method, and apparatus is that it provides for a computer implemented technique for determining speed of an AC motor.

Therefore, according to one embodiment of the present invention, a motor management system includes a computer readable storage medium and a processing unit. The processing unit is configured to determine a voltage value of a voltage input to an alternating current (AC) motor during operation of the AC motor, determine a frequency value of at least one of a voltage input and a current input to the AC motor during operation of the AC motor, determine a load value from the AC motor during operation of the AC motor, and access a set of motor nameplate data, where the set of motor nameplate data includes a rated power, a rated speed, a rated frequency, and a rated voltage of the AC motor. The processing unit is also configured to estimate a motor speed of the AC motor in operation based on the voltage value, the frequency value, the load value, and the set of nameplate data and also store the motor speed on the computer readable storage medium.

According to another embodiment of present invention, a method for controlling motor speed includes determining a voltage of energy input into a motor in operation via a voltage sensing device, determining a frequency of energy input into the motor in operation, and determining a load value of the motor in operation. The method also includes estimating a motor speed of the motor in operation based on the voltage, the frequency, and the load value, where estimating the motor speed is free of frequency-domain signal processing operations. The method further includes storing the motor speed on a computer readable storage medium.

According to yet another embodiment of the present invention, a motor speed estimation system is programmed to estimate a motor speed of a motor based on a frequency of energy input to the motor during operation, a voltage of the energy input to the motor during operation, a load value from the motor during operation, a rated output power of the motor, a rated speed of the motor, a rated voltage of the motor, and a rated frequency of the motor. The system is also programmed to store the motor speed on a computer storage device.

The present invention has been described in terms of preferred embodiments, and it is recognized that equivalents, alternatives, and modifications, aside from those expressly stated, are possible and within the scope of the appending claims.

What is claimed is:

1. A motor management system comprising:
a non-transitory computer readable storage medium; and a processing unit configured to: determine a voltage value of a voltage input to an alternating current (AC) motor during operation of the AC motor; determine a frequency value of at least one of a voltage input and a current input to the AC motor during operation of the AC motor; determine a load value from the AC motor during operation of the AC motor; access a set of motor nameplate data, wherein the set of motor nameplate data comprises a rated power, a rated speed, a rated frequency, and a rated voltage of the AC motor; estimate a motor speed of the AC motor in operation based on the voltage value, the frequency value, the load value, and the set of nameplate data; and store the motor speed on the non-transistory computer readable storage medium.

2. The motor management system of claim 1 wherein the processing unit is configured to estimate the motor speed via estimation operations free of frequency-domain signal processing operations.

3. The motor management system of claim 1 further comprising a variable frequency drive coupled to the AC motor, wherein the AC motor is driven by the variable frequency drive.

4. The motor management system of claim 1 wherein the processing unit is further configured to adjust motor speed based on the estimation of the motor speed.

5. The motor management system of claim 1 wherein the determination of a load value is based on at least one of a power output value of power input to the AC motor, a load percentage value, and a power input value of power input to the AC motor.

6. The motor management system of claim 1 wherein the determination of a load value is further based on an efficiency value of the AC motor.

7. The motor management system of claim 1 wherein the frequency value is a measured value.

8. The motor management system of claim 1 wherein the frequency value is a calculated value.

9. The motor management system of claim 1 wherein the AC motor is one of a multi-phase motor and a single-phase motor.

10. The motor management system of claim 1 wherein the motor management system is a device removably coupleable to a motor drive.

11. A method for controlling motor speed comprising:
determining a voltage of energy input into a motor in operation via a voltage sensing device; determining a frequency of energy input into the motor in operation; determining a load value of the motor in operation; estimating a motor speed of the motor in operation based on the voltage, the frequency, and the load value, wherein estimating the motor speed is free of free of fast frequency-domain signal processing operations; accessing a set of motor rating values of the motor, the set of motor rating values comprises a rated speed, a rated frequency, and one of a rated output power and a rated voltage, wherein estimating the motor speed is further based on the set of motor rating values; and storing the motor speed on a non-transistory computer readable storage medium.

12. The method of claim 11 further comprising modifying the motor speed via a motor drive.

13. The method of claim 11 further comprising displaying the motor speed on a display screen to a user.

14. The method of claim 11 further comprising:
accessing an efficiency value of the motor; and
determining a power input into the motor in operation, wherein determining a load value of the motor is based on the efficiency value of the motor and the power input into the motor.

15. The method of claim 11 wherein the AC motor is coupled to a soft-starter.

16. The method of claim 11 wherein the AC motor is driven by a variable frequency drive.

17. The method of claim 11 wherein determining the load value comprises determining an output power without determining the output power via a power sensor.

18. A motor speed estimation system, the motor speed estimation system programmed to: estimate a motor speed of a motor based on a frequency of energy input to the motor during operation, a voltage of the energy input to the motor during operation, a load value from the motor during operation, a rated output power of the motor, a rated speed of the motor, a rated voltage of the motor, and a rated frequency of the motor; and store the motor speed on a non-transistory computer storage device.

19. The motor speed estimation system of claim 18 further programmed to adjust the motor speed after estimation of the motor speed.

20. The motor speed estimation system of claim 18 wherein the motor speed estimation system is a removable device coupled to a motor drive of the motor.

21. The motor speed estimation system of claim 18 wherein the load value is estimated from an input power value and an efficiency value of the motor in operation.

22. The motor speed estimation system of claim 18 wherein the AC motor is driven by an inverter.

23. The motor speed estimation system of claim 18 wherein the estimation of the motor speed is free of fast Fourier transform (FFT) operations and wavelet analysis operations.

24. The motor speed estimation system of claim 23 wherein the frequency of the energy input is different than the rated frequency and the voltage of the energy input is different than the rated voltage.

* * * * *

UNITED STATES PATENT AND TRADEMARK OFFICE
CERTIFICATE OF CORRECTION

PATENT NO. : 8,203,298 B2
APPLICATION NO. : 12/547723
DATED : June 19, 2012
INVENTOR(S) : Lu et al.

It is certified that error appears in the above-identified patent and that said Letters Patent is hereby corrected as shown below:

Col. 11, line 55 (Claim 11), delete "speed is free of free of fast" and substitute therefore -- speed is free of --.

Signed and Sealed this
Fourteenth Day of August, 2012

David J. Kappos
*Director of the United States Patent and Trademark Office*